(12) United States Patent
Lester (10) Patent No.: US 9,489,360 B2
(45) Date of Patent: Nov. 8, 2016

(54) IDENTIFYING EXTRA MATERIAL IN COMPANION CONTENT

(71) Applicant: Audible, Inc., Newark, NJ (US)

(72) Inventor: Kevin Scott Lester, Hoboken, NJ (US)

(73) Assignee: Audible, Inc., Newark, NJ (US)

( * ) Notice: Subject to any disclaimer, the term of this patent is extended or adjusted under 35 U.S.C. 154(b) by 363 days.

(21) Appl. No.: 14/019,260

(22) Filed: Sep. 5, 2013

(65) Prior Publication Data

US 2015/0067459 A1    Mar. 5, 2015

(51) Int. Cl.
*G06F 17/00* (2006.01)
*G06F 17/24* (2006.01)
*G06Q 30/02* (2012.01)

(52) U.S. Cl.
CPC ......... *G06F 17/241* (2013.01); *G06Q 30/0253* (2013.01)

(58) Field of Classification Search
None
See application file for complete search history.

(56) References Cited

U.S. PATENT DOCUMENTS

| | | |
|---|---|---|
| 5,203,705 A | 4/1993 | Hardy et al. |
| 5,351,189 A | 9/1994 | Doi et al. |
| 5,657,426 A | 8/1997 | Waters et al. |
| 5,737,489 A | 4/1998 | Chou et al. |
| 5,978,754 A | 11/1999 | Kumano |
| 6,076,059 A | 6/2000 | Glickman et al. |
| 6,208,956 B1 | 3/2001 | Motayama |
| 6,256,610 B1 | 7/2001 | Baum |
| 6,260,011 B1 | 7/2001 | Heckerman et al. |
| 6,356,922 B1 | 3/2002 | Schilit et al. |
| 6,766,294 B2 | 7/2004 | MaGinite et al. |
| 6,912,505 B2 | 6/2005 | Linden et al. |
| 7,107,533 B2 | 9/2006 | Duncan et al. |
| 7,231,351 B1 | 6/2007 | Griggs |

(Continued)

FOREIGN PATENT DOCUMENTS

| | | |
|---|---|---|
| CN | 103988193 A | 8/2014 |
| CN | 104662604 A | 5/2015 |

(Continued)

OTHER PUBLICATIONS

International Search Report issued in connection with International Patent Application No. PCTUS12/30186 mailed on Jun. 20, 2012, 12 pages.

(Continued)

*Primary Examiner* — Keith Bloomquist
(74) *Attorney, Agent, or Firm* — Knobbe, Martens, Olson & Bear, LLP (57) ABSTRACT

Systems and methods are disclosed which facilitate identifying extra substantive material within a content item not included within corresponding companion content items. For example, extra substantive material may include commentary, interviews, or improvisation included within an audio book and not included within a corresponding electronic book. Specifically, an electronic marketplace is disclosed that may analyze two companion content items to determine similarities and differences between the content items. Thereafter, portions that differ between the content items may be further analyzed to determine whether these portions include extra substantive material. Also disclosed is an electronic marketplace for providing information regarding content items, including the existence of extra substantive material within a content item. In some instances, the electronic marketplace may be configured to provide samples of extra content within a content item to a user.

24 Claims, 6 Drawing Sheets

(56) References Cited

U.S. PATENT DOCUMENTS

| | | | |
|---|---|---|---|
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,412,718 B1 | 4/2013 | Bilger | |
| 8,442,423 B1 | 5/2013 | Ryan et al. | |
| 8,527,272 B2 | 9/2013 | Qin et al. | |
| 8,548,618 B1 | 10/2013 | Story, Jr. et al. | |
| 8,577,668 B2 | 11/2013 | Rosart et al. | |
| 8,631,089 B1* | 1/2014 | Pereira | G06F 3/165 705/14.37 |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2002/0184189 A1 | 12/2002 | Hay et al. | |
| 2003/0061028 A1 | 3/2003 | Dey et al. | |
| 2003/0078856 A1* | 4/2003 | Zubi | 705/26 |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0022113 A1 | 1/2005 | Hanlon | |
| 2006/0148569 A1 | 7/2006 | Beck | |
| 2007/0016314 A1 | 1/2007 | Chan et al. | |
| 2007/0061352 A1* | 3/2007 | Dimitrova | G06F 17/30746 |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0027726 A1 | 1/2008 | Hansen et al. | |
| 2008/1005656 | 1/2008 | Pang et al. | |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 | 6/2011 | Yazdani et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1 | 10/2011 | Yi et al. | |
| 2011/0276680 A1* | 11/2011 | Rimon | H04N 21/2543 709/224 |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0023095 A1* | 1/2012 | Wadycki | G06F 17/30017 707/723 |
| 2012/0030288 A1 | 2/2012 | Burckart et al. | |
| 2012/0109640 A1 | 5/2012 | Anisimovich et al. | |
| 2012/0116979 A1* | 5/2012 | Hatch | G06Q 50/188 705/80 |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1* | 9/2012 | Story, Jr. | H04L 67/1095 709/248 |
| 2012/0310642 A1 | 12/2012 | Cao et al. | |
| 2012/0310649 A1* | 12/2012 | Cannistraro | G10L 13/00 704/260 |
| 2012/0315009 A1 | 12/2012 | Evans et al. | |
| 2012/0324324 A1* | 12/2012 | Hwang | G09B 5/06 715/203 |
| 2013/0041747 A1* | 2/2013 | Anderson | G06Q 10/10 705/14.39 |
| 2013/0073449 A1* | 3/2013 | Voynow | G06Q 30/0601 705/39 |
| 2013/0073675 A1* | 3/2013 | Hwang | G06F 17/30014 709/217 |
| 2013/0074133 A1* | 3/2013 | Hwang | G06F 17/30038 725/93 |
| 2013/0130216 A1 | 5/2013 | Morton et al. | |
| 2013/0212454 A1* | 8/2013 | Casey | G06Q 10/10 715/203 |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0223272 A1 | 8/2014 | Arora et al. | |
| 2014/0250219 A1* | 9/2014 | Hwang | G06F 17/2827 709/224 |
| 2014/0278360 A1* | 9/2014 | Clark | G06F 17/241 704/9 |
| 2015/0026577 A1 | 1/2015 | Story et al. | |
| 2015/0340038 A1 | 11/2015 | Dzik et al. | |

FOREIGN PATENT DOCUMENTS

| | | |
|---|---|---|
| EP | 2689346 | 1/2014 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 | 7/2005 |
| JP | 2007-522591 | 8/2007 |
| JP | 2007-249703 | 9/2007 |
| JP | 2010-250023 | 11/2010 |
| NZ | 532174 | 1/2007 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

International Search Report and Written Opinion in PCT/US2013/042903 mailed Feb. 7, 2014.

International Search Report issued in connection with International Application No. PCT/US13/53020 mailed on Dec. 16, 2013.

Extended Search Report in European Application No. 12761104.4 dated Apr. 20, 2015.

Office Action in Canadian Application No. 2830906 dated Mar. 17, 2015.

Office Action in Japanese Application No. 2014-501254 dated Oct. 14, 2014.

(56) References Cited

OTHER PUBLICATIONS

International Preliminary Report on Patentability in PCT/US2013/042903 mailed Dec. 2, 2014.
International Preliminary Report on Patentability issued in connection with International Patent Application No. PCT/US12/30198 mailed on Jan. 30, 2014, 8 pages.
Office Action in Japanese Application No. 2014-501257 dated Aug. 25, 2014.
International Search Report and Written Opinion in PCT/US2014/014508 mailed Jun. 25, 2014.
Extended Search Report in European Application No. (12761404.8) dated Jan. 26, 2015.
International Preliminary Report issued in connection with International Application No. PCT/US13/53020 mailed on Feb. 12, 2015.
Arar, Y., Blio E-Book Platform: No Reader (Yet), But Great Graphics, Jan. 7, 2010.
Beattie, V., et al., Reading Assistant: Technology for Guided Oral Reading, Scientific Learning, Apr. 10, 2012, 5 pages.
Dzik, S.C., U.S. Appl. No. 13/604,482, filed Sep. 5, 2012, entitled Identifying Corresponding Regions of Content.
Dzik, S.C., U.S. Appl. No. 13/604,486, filed Sep. 5, 2012, entitled Selecting Content Portions for Alignment.
Dzik, S.C., U.S. Appl. No. 13/662,306, filed Oct. 26, 2012, entitled Content Presentation Analysis.
Feature: Synched Audio and Text, Enhanced Editions, Aug. 31, 2009, last accessed Nov. 15, 2012, available at http://www.enhanced-editions.com/blog/2009/08/enhanced-editions-features-exclusive-soundtracks-and-extracts/.
Hwang, D.C., et al., U.S. Appl. No. 13/536,711, filed Jun. 28, 2012, entitled Pacing Content.
International Search Report issued in connection with International Patent Application No. PCT/US12/30198 mailed on Jun. 20, 2012, 16 pages.
Levinson, S.E., et al., Continuous Speech Recognition from a Phonetic Transcription, Acoustics, Speech, and Signal Processing, Apr. 1990, pp. 190-199.
Roub, P., I'll Buy an E-book Reader When . . . , Nov. 16, 2007, available at: http://roub.net/blahg/2007/11/16/ill-buy-an-eboo/ (accessed Sep. 6, 2012), 2 pages.
Vignoli, F., et al., A Text-Speech Synchronization Technique With Applications to Talking Heads, Auditory-Visual Speech Processing, ISCA Archive, Aug. 7-10, 1999.
Weber, F.V., U.S. Appl. No. 13/531,376, filed Jun. 22, 2012, entitled Modelling Expected Errors for Discriminative Training.
Office Action in Japanese Application No. 2014-501257 dated Apr. 6, 2015.
Office Action in Canadian Application No. 2830622 dated Jun. 10, 2015.
Office Action in Japanese Application No. 2014-501254 dated May 11, 2015.
International Preliminary Search Report on Patentability in PCT/US2014/014508 mailed Aug. 4, 2015.

\* cited by examiner

Fig. 6

IDENTIFYING EXTRA MATERIAL IN COMPANION CONTENT

BACKGROUND

Generally described, user computing devices may facilitate the playback or display of items of content, such as audio books, electronic books, songs, videos, television programs, computer and video games, multi-media content, and the like. For example, an electronic book reader computing device ("e-reader") may display an electronic book on a screen and/or play an audio book through speakers or headphones.

In some instances, multiple items of content may be generated based on a single base content. For example, both an electronic book and an audio book may be generated based on a physical book. Multiple items of content that correspond to the same base content may generally be referred to as "companion" items of content.

In some instances, differences may exist between two companion items of content. Such differences may be due at least in part to differences in format of the items. For example, a textual content may include a table of contents, index or appendices not included within an audio content. In other instances, differences between two companion items of content may indicate that extra substantive material exists within one or both items. For example, an audio book may include a recording of an interview with the author that has not been included within a corresponding electronic book. As a further example, a narrator may choose to omit portions of an electronic book when creating a corresponding audio book (e.g., to reduce the duration of the audio book).

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to identifying substantive material within a first content item (e.g., an audio book) that do not exist within a corresponding second content item (e.g., an electronic book). Substantive material, as used herein, generally describes content that materially contributes to substance of a content item, such as interviews, commentaries, improvisational material, portions or previews of additional content, etc. Accordingly, substantive material can be distinguished from non-substantive material that does not contribute to the substance of a content item. Examples of such non-substantive material may include tables of contents, indexes, or other organizational material, as well as formalistic material, such as legal notices (e.g., for copyright purposes). For example, it is common for an electronic book to include a sample of a forthcoming work by the same author; however, a corresponding audio book frequently omits such a sample. As a further example, where an author of a base content (e.g., a novel) self-narrates an audio book of the base content, it is common (especially in certain genres, such as comedy) for the author to include improvisational or additional material not included in the base content. For example, in the genre of comedic works, an author may describe anecdotes or other stories within an audio book that are not recorded within a base content or other corresponding contents (e.g., an electronic book). Accordingly, it may be beneficial to identify the existence of extra substantive material within a content item, and to inform users of the presence or absence of such material. Further, it may be beneficial to allow identification of such extra substantive material at least in part based on automated processes, without requiring a generator or publisher of a content item to identify extra substantive material.

Accordingly, embodiments of the present disclosure enable identification of extra substantive material within a content item based at least in part on comparing the content item in order to a companion content item. More specifically, a content alignment service is disclosed that may compare the content item to an item of companion content to locate portions of the content item (e.g., an audio book) that have no counterpart or matching portion in the item of companion content (e.g., an electronic book corresponding to the audio book). These mismatched portions may be referred to herein as "uncertain regions." Further processing may be performed by the content alignment service on uncertain regions to determine whether the uncertain regions are a result of errors during analysis, or whether the uncertain regions likely correspond to extra substantive material. Once identified, the existence of extra substantive material within a region may be verified, and the extra substantive material classified and/or categorized in order to provide more information regarding the content of the extra substantive material. Thereafter, information regarding any identified extra substantive material may be presented to a user (e.g., in connection with an information page regarding the content item in question). In some embodiments, samples of a content item may be generated based at least in part on extra substantive material of the content item.

In addition, alignment of content items may be facilitated at least in part based on synchronization of the content items, as described in U.S. patent application Ser. No. 13/070,313, filed on Mar. 23, 2011, entitled "SYNCHRONIZING DIGITAL CONTENT," which is hereby incorporated by reference in its entirety.

In one embodiment, in order to identify uncertain regions that may constitute extra substantive material, the content alignment service may obtain a textual transcription of an item of content including audio content (e.g., an audio book) and then compare the textual transcription of the audio content to an item of content including textual content (e.g., an electronic book). The textual transcription may be obtained either by obtaining a pre-existing transcription or by generating one using speech-to-text recognition techniques. The transcription may include timestamps for each of the words recognized in the audio content representing a time interval during which a particular word is spoken, sung, shouted, or otherwise presented in the audio content. In addition, the textual transcription of the audio content may be divided into blocks, which may correspond to relatively large divisions of the item of content including audio content. For example, a block of an audio book might correspond to one or more chapters of the audio book, or might correspond to an interval of time in the audio book, such as forty-five minutes or an hour.

Each block of the transcription may be aligned with a block of an item of textual content that is a companion to the item of content including audio content. This block-by-block alignment may be based on a correlation measure, which may measure the similarity between the blocks. A correlation measure between the block of textual content and the block of the transcription may be computed based on, for example, a percentage of words in common or the similarity of the distributions of words between the two blocks. If the correlation measure satisfies a threshold, the block of textual content may be aligned to the block of textual content. Timestamps may be assigned to the words of the textual content in the block of textual content based on corresponding timestamped words in the transcription of the block of the audio content. If the correlation does not satisfy a threshold, the block may be identified as an uncertain region potentially including extra substantive material.

In some embodiments, additional routines and processes may be applied to uncertain regions in order to verify potential alignment with a corresponding item. Examples of such routines and processes are provided in U.S. patent application Ser. No. 13/604,482, filed on Sep. 5, 2012, and entitled "IDENTIFYING CORRESPONDING REGIONS OF CONTENT," (the '482 application) which is hereby incorporated by reference in its entirety.

Thereafter, each uncertain region may be processed in order to verify the existence of extra substantive material within the region. In one embodiment, such processing may include applying threshold criteria to each region, such as verifying the region is of a predetermined duration and/or automatically inspecting the content of the region. If a region satisfies the applied threshold criteria, the region may be passed to a human interaction task system configured to enable human review of the region. Illustratively, the human interaction task system may enable a human operator to verify that extra substantive material is included within an uncertain region (e.g., as opposed to the uncertain region containing material mirrored in a companion content item). The human interaction task system may further enable a human operator to classify and/or categorize extra substantive material, or to provide additional information regarding the extra substantive material (e.g., exact start and stop points).

In one embodiment, an electronic marketplace may be configured to provide information regarding content items, including identified extra substantive materials within such content items. For example, the electronic marketplace may provide functionality for browsing and searching items of content. Further, the electronic marketplace may provide detail pages describing an item of content, and enabling a user to acquire the item of content via the electronic marketplace. As will be described below, the electronic marketplace may further enable users to acquire limited portions of content items (e.g., samples). In some instances, such samples may be generated based at least in part on extra substantive material within a content item.

It will be appreciated that embodiments of the present disclosure may operate on many different types of content. Generally described, content can refer to any data that can be directly or indirectly accessed by a user, including, but not limited to audio books, electronic books, songs, videos, television programs, computer and video games, multimedia content, digital images, digital video, displayable text, audio data, electronic documents, computer-executable code, blocks or portions of the above, and the like. Accordingly, "item of textual content" may generally refer to any electronic item of content that includes text. Likewise, "item of audio content" may generally refer to any electronic item of content that includes audio content.

In addition, while the present description generally refers to alignment between audio and textual contents, embodiments of the present disclosure may further identify extra substantive material between contents of different types. For example, embodiments of the present disclosure may identify extra substantive material that exists within a video content, or that has been omitted from a video content and including within a companion audio or textual content. As will be described in more detail below, extra substantive material within a video content (or omitted from the video content) may be identified based on alignment of the video content to a corresponding companion content. While alignment of companion content pairs is generally described herein with reference to alignment of textual and audio content, embodiments of the present disclosure may further include alignment of video content to other content types (e.g., audio or video). Further examples of routines and processes for alignment of video content to other content types are described within U.S. patent application Ser. No. 13/535,240, entitled "MANAGING RELATED DIGITAL CONTENT," and filed Jun. 27, 2012 (the '240 application), the entirety of which is hereby incorporated by reference. For example, FIG. 4A of the '240 application describes a routine for aligning a textual content to a video adaptation of that textual content.

Figure 1:
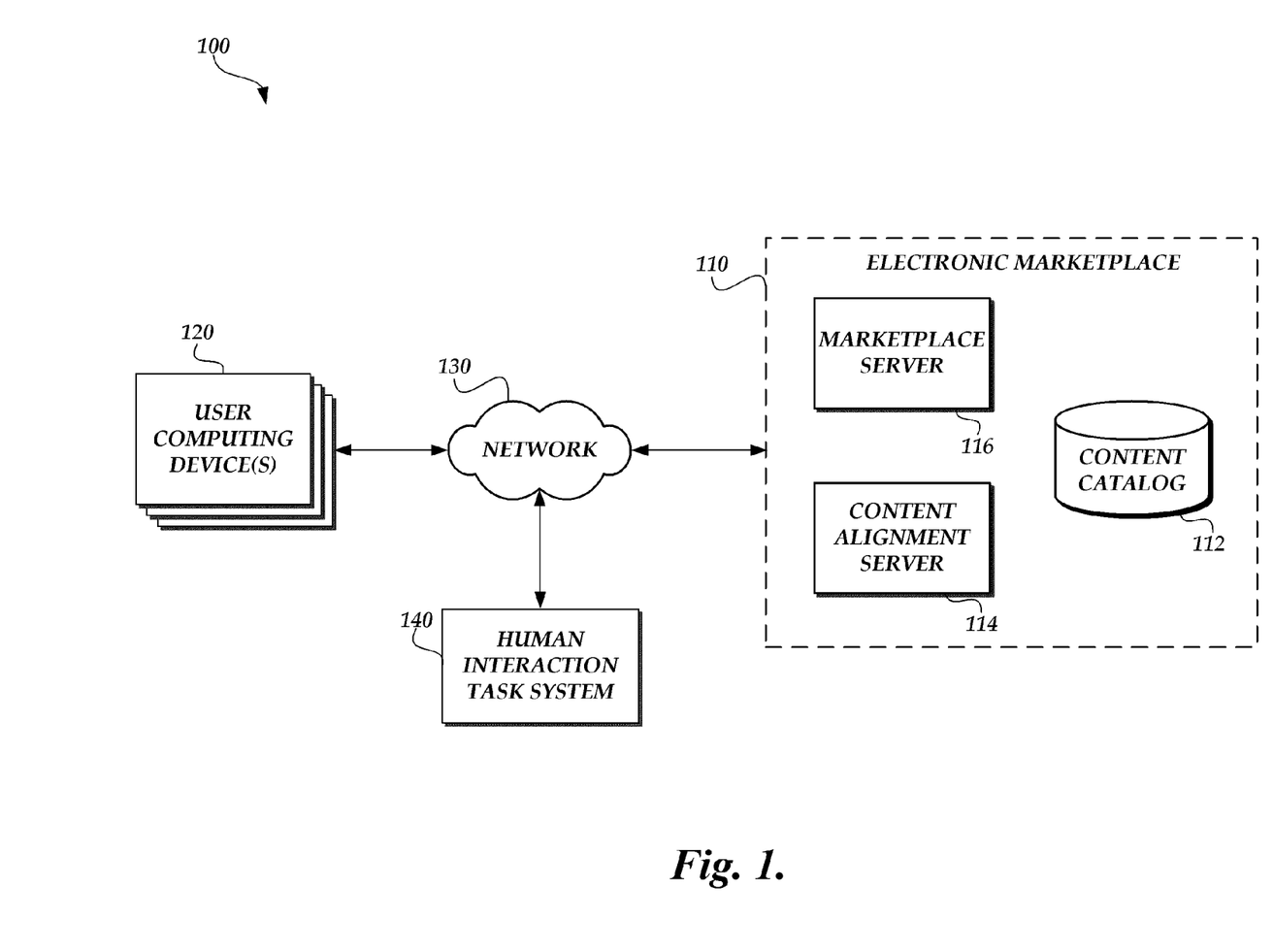
FIG. 1 is a block diagram depicting an illustrative operating environment in which an electronic marketplace enables users to browse and acquire one or more items of content including extra substantive material not included within a corresponding companion content.

Turning to FIG. 1, a schematic block diagram is shown depicting an illustrative operating environment 100 in which a user computing device 120 may interact with an electronic marketplace 110 to acquire information regarding a content item, including information regarding extra substantive material included within the content item. As will be described below, electronic marketplace 110 may further enable a user computing device 120 to acquire samples of extra substantive material present within a content item. As illustrated in FIG. 1, the operating environment 100 includes one or more user computing devices 120 in communication with an electronic marketplace 110 via a network 130.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

Accordingly, a user, using his or her computing device 120, may communicate with the electronic marketplace 110 regarding content items made available by the electronic marketplace 110. The content provided via the electronic marketplace 110 may correspond to any electronically represented content, such as audio recordings, electronic books, video recordings, movies, games and multimedia.

In one embodiment, a user may communicate with the electronic marketplace 110 in order to browse descriptions of content items made available by the electronic marketplace 110, including information regarding extra substantive material within a content item. In another embodiment, a user may communicate with the electronic marketplace 110 in order to acquire desired content items. Further, the user may communicate with the electronic marketplace 110 in order to acquire content samples corresponding to a content item, which may in some instances include extra substantive material from the content item. Content samples may correspond to limited portions of the content which allow a user to learn more about an item of content before deciding to acquire the content item. For example, acquisition of an item of content may be associated with a purchase price, while acquisition of a content sample corresponding to the item of content may be associated with a lower purchase price, or no purchase price. As a further example, acquisition of an item of content may require a large transfer between the electronic marketplace 110 and the user computing device 120, while acquisition of a content sample corresponding to the item of audio content may require a smaller transfer.

The electronic marketplace 110 is illustrated in FIG. 1 as operating in a distributed computing environment including several computer systems that are interconnected using one or more networks. More specifically, the electronic marketplace 110 may include a marketplace server 116, a content catalog 112, and a content alignment server 114 discussed in greater detail below. However, it may be appreciated by those skilled in the art that the electronic marketplace 110 may have fewer or greater components than are illustrated in FIG. 1. In addition, the electronic marketplace 110 could include various web services and/or peer-to-peer network configurations. Thus, the depiction of electronic marketplace 110 in FIG. 1 should be taken as illustrative and not limiting to the present disclosure.

Additionally, it should be noted that in some embodiments, components of the electronic marketplace 110, such as the content alignment server 114, may be executed by one or more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the marketplace server 116, the content catalog 112 and the content alignment server 114 may be embodied in a plurality of components, each executing an instance of the respective marketplace server 116, content catalog 112 and content alignment server 114. A server or other computing component implementing any one of the marketplace server 116, the content catalog 112 and the content alignment server 114 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 116, content catalog 112 and content alignment server 114. The memory may generally include RAM, ROM, other persistent and auxiliary memory, and/or any non-transitory computer-readable media.

With further reference to FIG. 1, illustrative components of the electronic marketplace 110 will now be discussed. Specifically, the electronic marketplace 110 may include a content alignment server 114 configured to align companion items of content and generate synchronization information therefrom. As will be described below, alignment of companion items of content may enable identification of extra substantive material within a content item, such as interviews, improvisational work, bonus material, etc. In addition, the content alignment server 114 may be configured to generate content synchronization information, enabling synchronous output of companion content items (e.g., an audio book and corresponding electronic book). Additional operations of the content alignment server 114 are described in further detail below.

The content alignment server 114 may be in communication with a content catalog 112 storing one or more items of content, such as items of audio content (e.g., audio books), items of textual content (e.g., electronic books), or other items of content. The content catalog 112 may also be configured to store information regarding items of content, such as pricing information related to the content item, metadata relating to the content item (e.g., duration, size, author, producer, narrator, translator, editor, etc.), or reviews or recommendations regarding the content item. Still further, the content catalog 112 may be configured to store alignment information mapping portions of a first content item (e.g., an audio book) to corresponding portions of a second, companion content item (e.g., an electronic book), as well as information regarding any extra substantive materials contained within the first or second content items. Alignment and/or extra substantive material information may be generated or obtained by the content alignment server 114 in accordance with embodiments of the present disclosure. In some embodiments, the content catalog 112 may include sample data related to a content item, such as samples of extra substantive material included within a content item. The content catalog 112 may be embodied in hard disk drives, solid state memories, and/or any other type of non-transitory, computer-readable storage medium remotely or locally accessible to the content alignment server 110. The content catalog 112 may also be distributed or partitioned across multiple storage devices as is known in the art without departing from the spirit and scope of the present disclosure.

The electronic marketplace 110 may further include a marketplace server 116 to enable browsing and acquisition of content items available from the electronic marketplace 110. Further, the marketplace server 116 may enable acquisition of content samples related to content available from the electronic marketplace 110. Still further, the marketplace server 116 may transmit content items and/or content samples corresponding to content items to user computing devices 120.

Specifically, the marketplace server 116 may obtain content information for content items offered by the electronic marketplace 110 and make such content information available to a user from a single network resource, such as a web site. A user may then acquire content items from the electronic marketplace 110. Illustratively, marketplace server 116 may generate one or more user interfaces through which a user, utilizing a user computing device 120, may browse content items made available by the electronic marketplace 110, submit queries for matching content items, view information and details regarding specific content items, request content samples, and acquire content items. One example of such a user interface is described below with respect to FIG. 5.

After the user selects a desired content item from the electronic marketplace 110, the marketplace server 116 may facilitate the acquisition of the content items. In this regard, the marketplace server 116 may receive payment information from the user device 120. Further, the marketplace server 116 may transmit the content item to the user computing device 120.

In addition, the operating environment 100 may include a human interaction task system 140 configured to assist the content alignment server 114 or other portions of the electronic marketplace 110. Generally described, the human interaction task system 140 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 140 might request a human worker to perform a HIT, e.g., for gathering information or answering a query, and to return the results or answers to the human interaction task system 140 for further processing and/or presentation to the requestor. Thus, in some embodiments, the content alignment server 114 directs the human interaction task system 140 to pose one or more queries about an item of content to a human worker of the human interaction task system 140. For example, a human worker may be asked to review an uncertain region within a content item to verify that the region corresponds to extra substantive material. The human worker may further be asked to identify boundaries of the extra substantive material, such as sentences, paragraphs or time stamps where the extra substantive material begins or ends. Still further, the human worker may be asked to identify or classify extra substantive material in an item of textual content (e.g., as an interview, improvisation, bonus content, additional author generated material, or non-author generated material). The human interaction task system 140 may receive answers to these queries and transmit them to the user computing device 102 or the content alignment server 114 to guide the operation of and/or provide information to the electronic marketplace 110. The human worker of the human interaction task system 140 may volunteer to respond to these and other tasks and to communicate other information about the item of content to the electronic marketplace 110.

Figure 2:
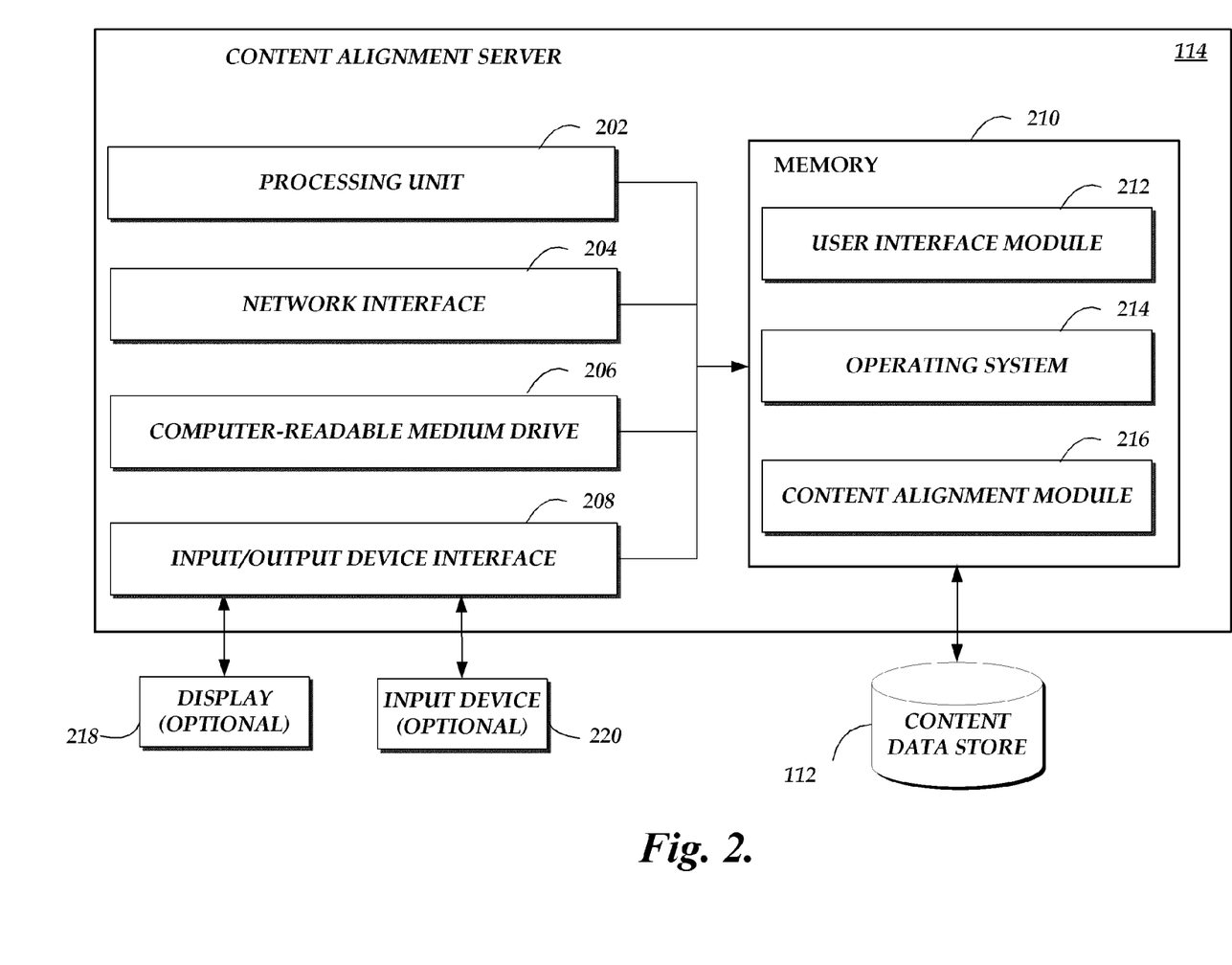
FIG. 2 is a block diagram depicting an illustrative content alignment server included within the electronic marketplace of FIG. 1.

The configuration of elements within FIG. 1 is intended to be illustrative in nature, and that other configurations are possible and within the scope of the present disclosure. For example, in some instances the human interaction task system 140 may be integral to or included within the electronic marketplace 110. As a further example, in some instances the content alignment server 114 may be distinct from the electronic marketplace 110. In still further embodiments, the content alignment server 114 and the human interaction task system 140 may represent an extra substantive material identification service (not shown in FIG. 1) associated with or distinct from the electronic marketplace 110. With reference now to FIG. 2, a schematic diagram of the content alignment server 114 shown in FIG. 1 will be described. Specifically, the content alignment server 114 as shown in FIG. 2 includes a processing unit 202, a network interface 204, a non-transitory computer-readable medium drive 206 and an input/output device interface 208, all of which may communicate with one another by way of a communication bus. As illustrated, the content alignment server 114 is optionally associated with, or in communication with, an optional display 218 and an optional input device 220. The display 218 and input device 220 may be used in embodiments in which users interact directly with the content alignment server 114, such as an integrated in-store kiosk, for example. In other embodiments, the display 218 and input device 220 may be included in a user computing device 120 shown in FIG. 1. The network interface 204 may provide the content alignment server 114 with connectivity to one or more networks or computing systems. The processing unit 202 may thus receive information and instructions from other computing systems (such as the user computing device 120) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content alignment service. The memory 210 generally includes RAM, ROM and/or other persistent or non-transitory computer-readable storage media. The memory 210 may store an operating system 214 that provides computer program instructions for use by the processing unit 202 in the general administration and operation of the content alignment server 114. The memory 210 may further include other information for implementing functionality of the content alignment server 114. For example, in one embodiment, the memory 210 includes a user interface module 212 that facilitates generation of user interfaces (such as by providing instructions therefor) for display upon a computing device such as user computing device 102. The user interface may be displayed via a navigation interface such as a web browser installed on the user computing device 120. In addition, memory 210 may include or communicate with the content catalog 112. Content stored in the content catalog 112 may include items of textual content and items of audio content, as described in FIG. 1.

In addition to the user interface module 212, the memory 210 may include a content alignment module 216 that may be executed by the processing unit 202. In one embodiment, the content alignment module 216 may be used to implement the content alignment service, example operations of which are discussed below with respect to FIGS. 3 and 4.

Those skilled in the art will recognize that in some embodiments, the content alignment server 114 may be implemented partially or entirely by the user computing device 120. Accordingly, the user computing device 120 may include a content alignment module 216 and other components that operate similarly to the components illustrated as part of the content alignment server 114, including a processing unit 202, network interface 204, non-transitory computer-readable medium drive 206, input/output interface 208, memory 210, user interface module 212, and so forth.

As discussed above, items of companion content, such as an item of textual content and an item of audio content, may be analyzed to determine which portions of the item of textual content substantially match or correspond to portions of the item of audio content, and whether an extra substantive material exists within either or both items of companion content. Content synchronization information may be generated that reflects correspondences between portions of the item of audio content and portions of the item of textual content. As will be described in more detail below, this content synchronization information may further reflect uncertain regions within a content item, which may include extra substantive material of the content item.

Figure 3:
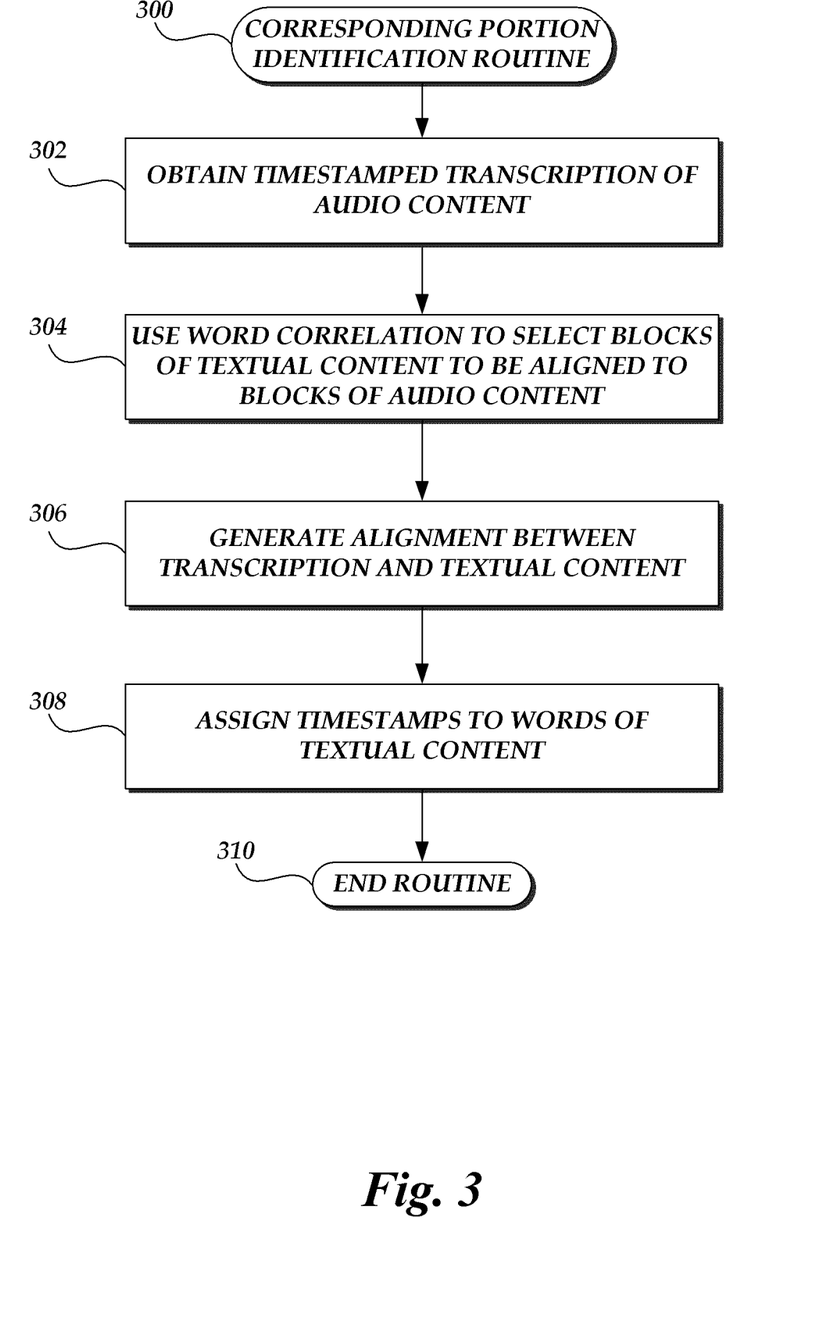
FIG. 3 is a flow diagram depicting an illustrative routine for processing companion items to determine uncertain regions that may include extra substantive material, as may be executed by the content alignment server included within the electronic marketplace of FIG. 1.

Accordingly, FIG. 3 depicts an illustrative routine 300 for identifying words in the item textual content that correspond to words in the item of audio content (e.g., words in the textual content that are audibly presented in the item of audio content). The illustrative routine 300 may be carried out, for example, by the content alignment server 114 of FIG. 1. Though description is made herein with reference to synchronizing an audio content and corresponding textual content, one skilled in the art will recognize that, in some embodiments, the routine may be carried out to synchronize additional or alternative content formats.

The illustrative routine 300 begins in block 302, in which the content alignment service may obtain a timestamped transcription of an item of audio content to be synchronously presented with a companion item of textual content. The timestamped transcription may include timestamps for each word of the transcript, corresponding to when each word is spoken (or otherwise presented audibly) in the audio content. For example, a word of the timestamped transcription might be assigned a timestamp of 1000 to 2000 milliseconds (ms) indicating that the word was spoken during that time interval of the audio content. In one embodiment, the time intervals for each word are generated using known speech processing technologies, such as SOFTSOUND® speech processing technologies available from the Autonomy Corporation, which is headquartered in Cambridge, England, United Kingdom.

In one embodiment, the content alignment server 114 obtains a timestamped transcription of the audio content by use of a computer-implemented speech-to-text recognition technique. In some instances, a pink noise filter may be applied to the audio content as or before it is transcribed. The pink noise filter may minimize the effect of background music or other ambient noise on the transcription results, so that any words (e.g., narration of an audio book) audibly presented (e.g., spoken) in the audio content may be more accurately recognized and transcribed. Techniques for transcribing speech to text are well known in the art and need not be discussed in further detail herein. Additionally, in other embodiments, the content alignment service may assign timestamps to a pre-existing transcription, or may obtain a pre-existing transcription that also includes timestamps.

In block 304, blocks of the textual content may be selected for alignment to blocks of the audio content. Blocks of the audio content may correspond to, for example, one or more chapters, tracks, movements, etc. of the audio content (if the audio content includes such block divisions), or might correspond to an interval of time in the audio content, such as forty-five minutes, an hour, or any other statistically significant interval. The transcription of the audio content may be divided into blocks corresponding to the blocks present in the audio content. The blocks of the transcription may then be compared to blocks of the textual content to identify similarities between the two. If a block of textual content is sufficiently similar to a block of transcription, the audio content from which the block of transcription was generated may be aligned with the block of textual content.

In one embodiment, a correlation measure is used to determine which blocks of audio content should be aligned to which blocks of textual content. The correlation measure may be based at least in part on words in common between the block of textual content and a block of the transcription of the audio content. For example, the correlation measure may measure a number or percentage of words in common between the block of textual content and the block of the transcription of the audio content. The correlation measure may also measure the similarity between the probability distribution of words in the block of textual content with the probability distribution of words in the block of the transcription, such as by measuring the Kullback-Liebler distance (KLD) between the word distributions of a block of textual content and a block of the transcription. Other correlation measures may be used as desired.

If no block of the transcription can be found with which a block of the textual content has a correlation measure satisfying a threshold, the block of textual content may be indicated as an uncertain region, which potentially contains extra substantive material. The selection process described with respect to block 304 may be repeated sequentially until each block of the textual content has been either selected for alignment with a block of the transcription or marked as an uncertain region. All blocks of the textual content not marked as an uncertain region may be aligned with a block of the transcription (and thus, a block of the audio content) to generate an alignment of the textual content and the transcription, as shown in block 306.

Other methods of identifying uncertain regions and/or likely extra substantive material within an item of content are possible and within the scope of the present disclosure. In one embodiment, the content alignment server 114 may align companion content items using algorithms that solve "longest common sequence" problems, an implementation of which can be found, for example, in the UNIX "diff" operation. Such an operation may identify regions of similar and differing content in both content items of a content item pair. Accordingly, regions that differ significantly between the content items of a content item pair may be identified as uncertain regions.

With continued reference to FIG. 3, once the alignment of the textual content and the transcription of audio content is generated in block 306, timestamps may be assigned to words of the textual content in block 308. Timestamps may be assigned to words of textual content in any of a number of ways, non-limiting examples of which are described below.

In some embodiments, the timestamps of the words in a block of the transcription of the audio content are used to assign timestamps to words in the aligned block of textual content. The timestamp assigned to a word in the block of textual content may represent a prediction or hypothesis that the word is audibly presented in the audio content during the time interval specified by the timestamp. This prediction or hypothesis may be based at least in part on the timestamps assigned to the words in the transcription. In one embodiment, timestamps are assigned to words of the block of textual content in this way by using SOFTSOUND® speech processing technologies developed by the Autonomy Corporation, substantially as discussed above.

In still other embodiments, timestamps are assigned to words of a block of textual content without necessarily referring to the block of the timestamped transcription. Accordingly, time heuristics that can determine a timestamp for a word of the textual content may be used. In one embodiment, the timestamp for a word of the textual content is estimated based at least in part on the number of letters of the word of the textual content. In another embodiment, the timestamp for a word of the textual content is estimated based at least in part on the number of syllables of the word of the textual content. For example, the first word of the block of textual content may be assigned a timestamp that corresponds to the beginning of the block of textual content (e.g., from 0 to 1000 milliseconds). The second word of the block of textual content may be assigned a timestamp that starts at the end of the first word and continues for the length of the second word (e.g., from 1000 to 2000 milliseconds).

In still other embodiments, timestamps are assigned to words of a block of textual content on a sequential basis. Generally described, the words of the timestamped transcription and the words of the block of textual content may be assigned to sequential numbers. Based on the timestamp of a word of the timestamped transcription, a sequentially corresponding word of the block of textual content may be assigned a substantially similar timestamp. An example will be illustrative. A first word of the block of the timestamped transcription may be assigned a timestamp of 0 to 1000 milliseconds. Accordingly, the first word of the block of textual content may be assigned a timestamp of 0 to 1000 milliseconds. A second word of the block of the timestamped transcription may be assigned a timestamp of 1000 to 2000 milliseconds. Accordingly, the second word of the block of textual content may be assigned a timestamp of 1000 to 2000 milliseconds.

Accordingly, by assigning timestamps to words within a textual content, an alignment between text within the textual content and audio within corresponding audio content may be determined. Additionally, such an alignment may identify portions of a textual content that do not correspond to portions of a companion audio content, and vice versa. As described below, these uncertain regions may be further processed in order to determine whether they correspond to extra substantive material.

In some embodiments, additional routines and processes may be applied to generated alignments in order to verify or increase the accuracy of the alignment. Examples of such routines and processes are provided the '482 application, incorporated by reference above. For example, FIGS. 3A AND 3B of the '482 application describe an illustrative routine that may be used to identify uncertain regions within content items. Further, FIGS. 4A and 4B of the '482 application described illustrative routines for further processing initially identified uncertain regions within a content item to determine whether each region corresponds to a portion of a companion content. Embodiments of the present disclosure may therefore utilize the routines disclosed within the '482 application to determine whether an uncertain region corresponds to any region of a companion content, or whether the uncertain region may contain extra substantive material.

Figure 4:
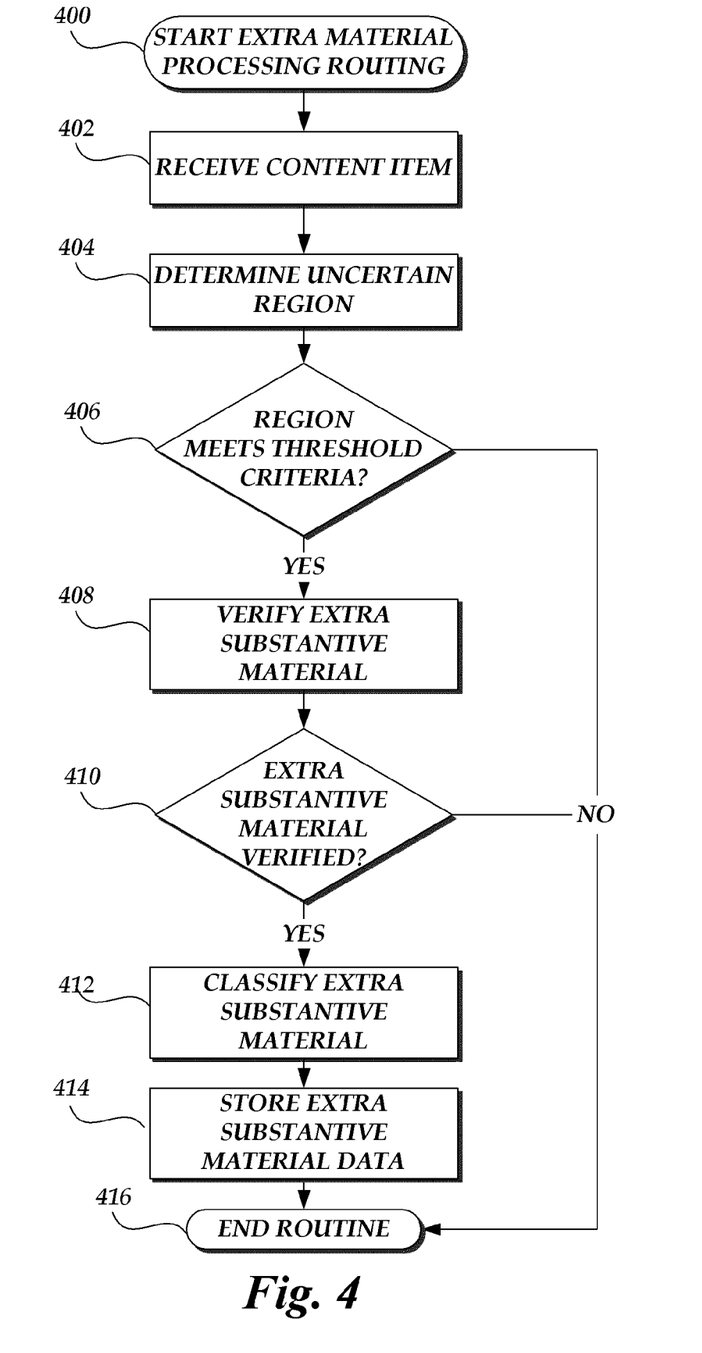
FIG. 4 is a flow diagram depicting an illustrative routine for verifying and categorizing extra substantive material within a content item available from the electronic marketplace of FIG. 1.

With reference now to FIG. 4, an illustrative routine 400 for processing uncertain regions within a content item (e.g., one content item of a companion content pair) to identify extra substantive material within the content item will be described. The illustrative routine 400 may be carried out, for example, by the content alignment server 114 of FIG. 1. Specifically, the routine 400 may begin at block 402, where a content item of a companion content pair is received at the content alignment server 114. Thereafter, at block 404, an uncertain region within the received content item may be determined. As discussed above, uncertain regions may generally correspond to regions of a content item that do not appear to correlate to regions within a companion content item. Accordingly, such uncertain regions may represent extra substantive material, such as bonus content, interviews, or improvisation included within a content item. In one embodiment, an uncertain region may be identified based at least in part on execution of the routine 300 of FIG. 3, described above. In another embodiment, an uncertain region may be identified in accordance with alternative processes or routines, such as those described in FIGS. 3A-4B of the '482 application incorporated by reference above. In some embodiments, these routines may be executed prior to execution of the routine 400, and may include marking, editing or otherwise recording information about a content item to identify uncertain regions. Accordingly, in some such embodiments, execution of block 404 may include loading information identifying an uncertain region within a content item. Though implementation of the routine 400 will be described with reference to a single uncertain region, embodiments of the present disclosure may also include execution of the routine 400 with respect to multiple uncertain regions (e.g., by executing all or a portion the routine 400 with respect to each uncertain region).

After determining an uncertain region, at block 406, the content alignment server 114 may apply threshold criteria to the uncertain region to determine whether the region likely corresponds to extra substantive material. Threshold criteria may include any set of criteria that may be automatically applied to an uncertain region to determine the likelihood that the uncertain region includes extra substantive material. For example, threshold criteria may include a minimum length of the uncertain region, such that regions below the minimum length are not further processed within the routine 400. Illustratively, the content alignment server 114 may determine that uncertain regions of under 500 words are not likely to represent extra substantive material. One skilled in the art will appreciate that alternative length measurements, such as a minimum duration, page count, paragraph counter, etc., are possible and within the scope of this disclosure. As a further example, threshold material may include textual analysis of the uncertain region to determine whether extra substantive material likely exists. Illustratively, textual analysis may be used to locate the amount or frequency of specific words that are likely to represent a lack of extra substantive material (e.g., "index," "appendix," "glossary," "endnotes," etc.), or that are likely to represent extra substantive material (e.g., "interview," "commentary," etc.). In embodiments where the content item includes audio content, auditory analysis may be conducted to determine auditory characteristics indicative of potential extra substantive material (e.g., multiple voices conducting an interview) or indicative of a lack of potential extra substantive material (e.g., silence, indiscernible noise, music). Still further, application of threshold criteria may include determining at what point within the content item an uncertain region occurs. For example, uncertain regions occurring at the very beginning of a content item may be less likely to represent extra substantive material, and therefore may not meet the threshold criteria. Conversely, uncertain regions occurring near the end of a content item may be more likely to represent extra substantive material, and may therefore meet the threshold criteria. In some embodiments, any combination of criteria discussed above may be applied to an uncertain region to determine whether a threshold is satisfied. For example, a weighting algorithm including multiple criteria may be applied to an uncertain region to determine a percentage likelihood that the uncertain region includes extra substantive material. In such embodiments, implementation of block 406 may include determining whether the uncertain region meets a minimum percentage likelihood of including extra substantive material. If the threshold criteria applied at block 406 is not met, the routine may end at block 416.

Alternatively, if the uncertain region satisfies the threshold criteria, the routine may continue at block 408, where extra content may be verified to include extra substantive material. In one embodiment, verification that extra substantive material exists within extra content may include utilization of a human interaction task system, such as human interaction task system 140 of FIG. 1. For example, the uncertain region may be presented to a human worker of the human interaction task system 140. A question may also be presented to the human worker, such as "Please identify any regions of extra substantive material in this content item." The human worker may interact with a computing device of the human interaction task system 140 to indicate whether the uncertain region includes extra substantive material. Though utilization of a human interaction task system 140 is described herein, various additional or alternative automatic, manual or semi-manual processes may be utilized to verify extra substantive material within an uncertain region. If extra substantive material is not verified to exist within the uncertain region, the routine 400 may end at block 416.

If extra substantive material is verified to exist within the uncertain region, the routine may continue at block 412, where the extra substantive material may be classified. In one embodiment, classification of extra substantive material may include further utilization of the human interaction task system 140 of FIG. 1. For example, the extra substantive material may be presented to a human worker of the human interaction task system 140. A question may also be presented to the human worker, such as "Please classify the extra substantive material presented." The human worker may interact with a computing device of the human interaction task system 140 to indicate a type of extra substantive material, such as "interview," "commentary," "improvisation," or "other." Though utilization of a human interaction task system 140 is described herein, various additional or alternative automatic, manual or semi-manual processes may be utilized to classify identified extra substantive material.

After receiving a classification of the extra substantive material within a content item, the routine 400 may proceed to block 414, where data regarding the identified extra substantive material may be stored. Such data may include, by way of non-limiting example, a location of the extra substantive material within the content item (e.g., including both beginning and ending locations), a duration of the extra substantive material, and a categorization of the extra substantive material. In one embodiment, the data may be stored within the content catalog 112 or another data store within the electronic marketplace 110 for later presentation to a user of the electronic marketplace 110.

Figure 5:
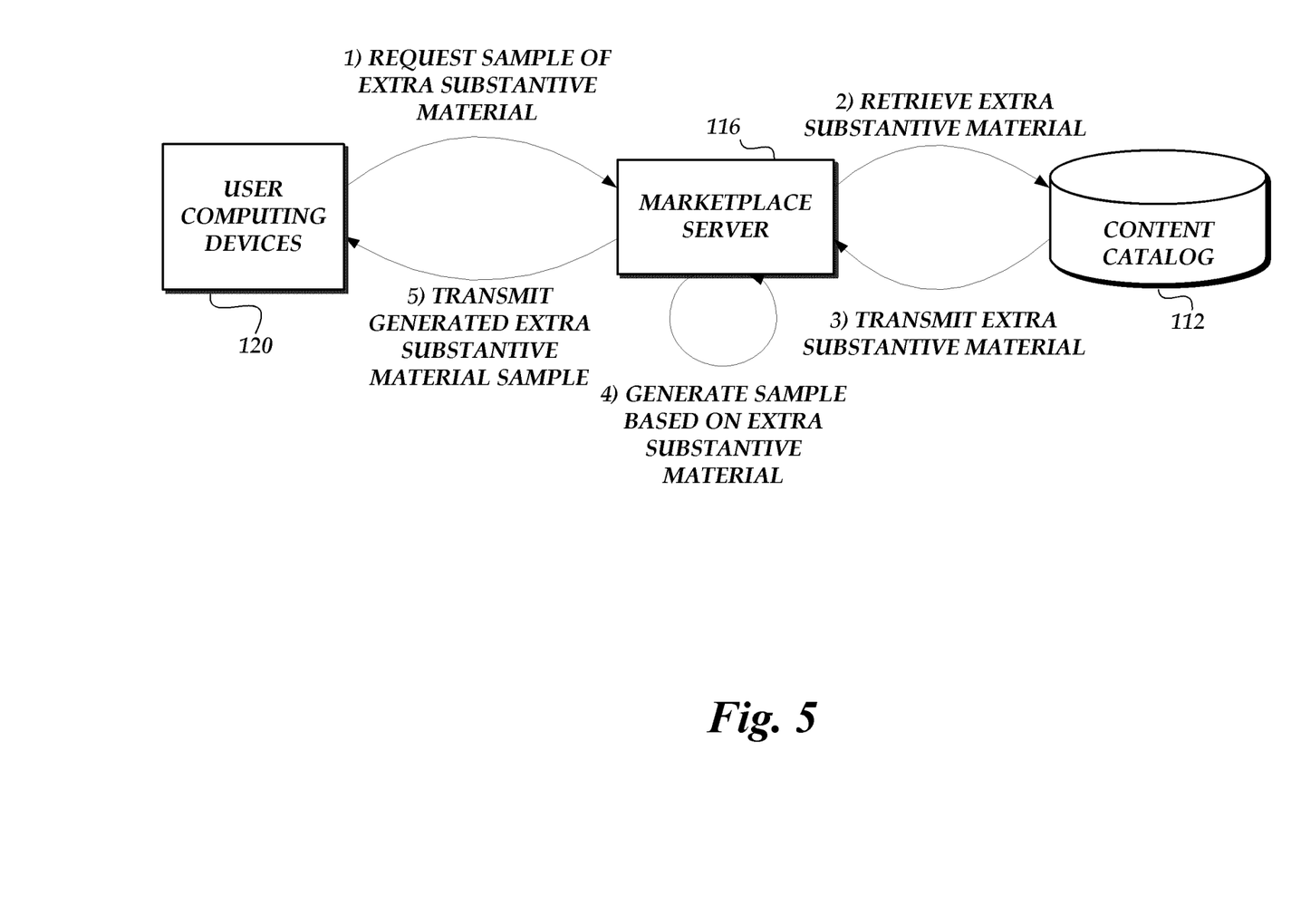
FIG. 5 is an illustrative block diagram of the operating environment of FIG. 1 depicting the generation of a content sample based on extra substantive material within a content item.

With reference now to FIG. 5, a block diagram depicting a user computing device 120 querying the electronic marketplace 110 shown in FIG. 1 for a sample of extra substantive material identified within an audio content item will be described. As depicted in FIG. 5, the user computing device 120, on behalf of the user, may submit a request for a sample of extra substantive material within a content item to the marketplace server 116 within the electronic marketplace 110. Illustratively, such a request could be submitted via a user interface, such as via an application on the user computing device 120 which interacts with the marketplace server 116. On example of such a user interface will be described in more detail with respect to FIG. 6, below.

With continued reference to FIG. 5, after submission of a request by the user computing device 120, the marketplace server 116 may submit a request to the content catalog 112 for extra substantive material corresponding to the content item, which may then transmitted by the content catalog 112 to the marketplace server 156. Thereafter, the marketplace server 116 may generate a sample of the received extra substantive material for transmission to the user. Generation of such a sample may include, by way of non-limiting example, editing of the extra substantive material to remove all but a limited portion of the extra substantive material; modification of the extra substantive material in order to restrict playback of the extra substantive material (e.g., in amount or duration of playback, in frequency of playback, etc.); or inclusion of digital rights management (DRM) functionality into the extra substantive material. In some instances, the marketplace server 116 may determine a portion of the extra substantive material to provide to the user computing device 120 based at least in part on preferences of a user. Examples of routines and processes for determining samples based on user preferences are provided within U.S. patent application Ser. No. 13/332,235, filed Dec. 20, 2011, and entitled "Providing Personalized Content Samples," which is hereby incorporated by reference in its entirety.

After generation of a sample based on extra substantive material within a content item, the content sample may be transmitted to the user computing device 120 from the marketplace server 116. Accordingly, the user, utilizing the user computing device 120, may consume at least a portion of the extra substantive material included within the content item.

Though the illustrative interactions of FIG. 5 are described with respect to a single user computing device 120, embodiments of the present disclosure may include interaction with multiple user computing devices 120. For example, a user may utilize a first user computing device 120 (e.g., a laptop or desktop computer) to request a sample of extra substantive material, and receive such a sample on a second computing device 120 (e.g., an electronic book reader, a personal audio player, etc.). Accordingly, the illustrative interactions of FIG. 5 are intended for illustrative purposes only.

Figure 6:
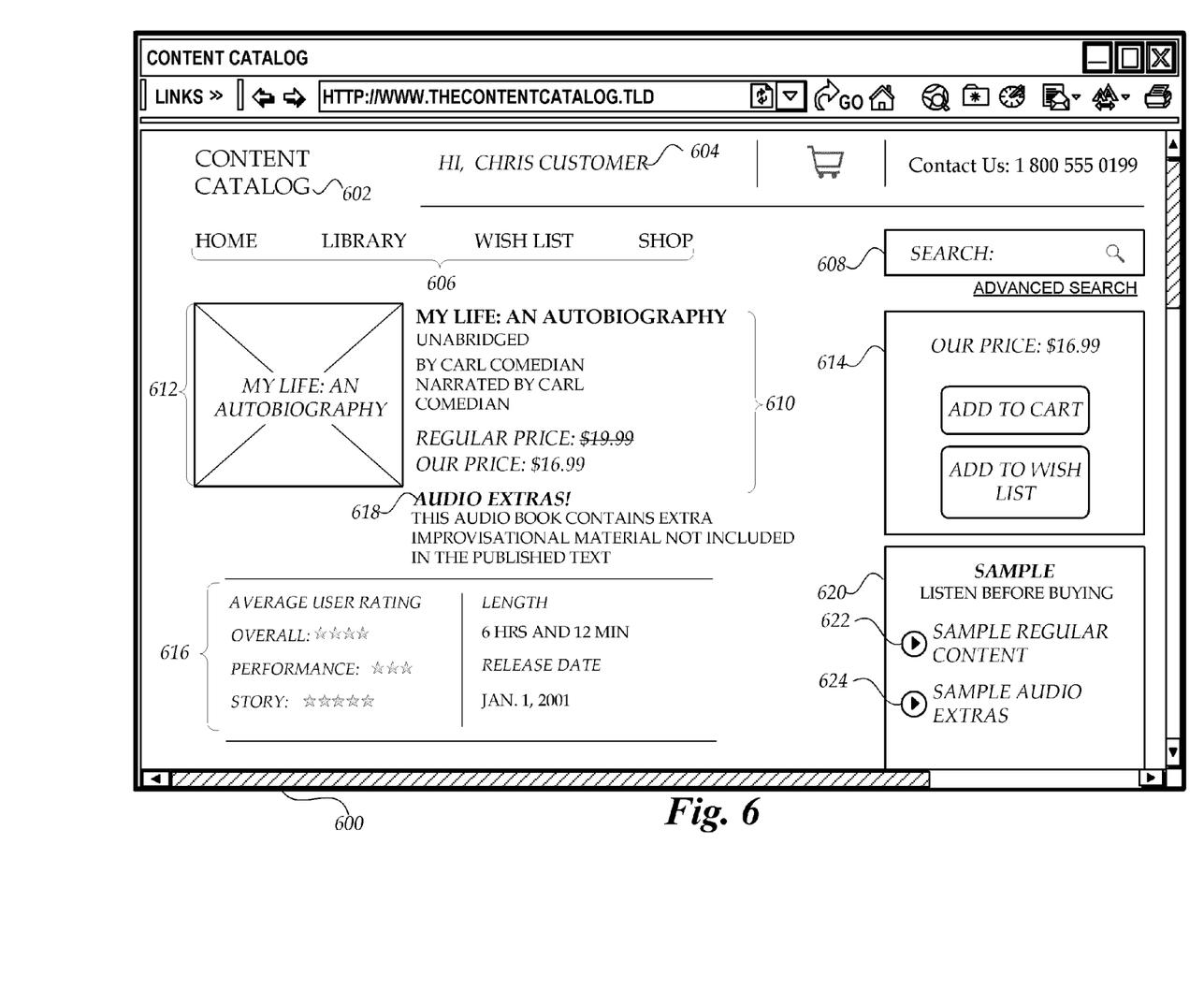
FIG. 6 depicts an illustrative user interface displayed on a user computing device that enables user review information regarding a content item, including an indication of extra portions of the content item not present within a corresponding item of companion content.

With reference now to FIG. 6, one example of an illustrative user interface 600 by which a user may view information regarding a content item, including the presence of extra substantive material within a content item, will be described. Specifically, the user interface 600 presents information regarding an audio content available for acquisition from the electronic marketplace 110, including information regarding extra substantive material identified within the audio content. While the user interface 600 is generally directed to audio content, embodiments of the present disclosure may include generation of user interfaces directed to other content formats, such as textual content or multimedia content.

In one embodiment, user interface 600 is generated by marketplace server 116 as a result of navigation by a user or as a result of selection of a search result returned by the marketplace server 116. As shown in FIG. 6, the user interface 600 provides information retrieved from the electronic marketplace 116, i.e., the "Content Catalog" 602 to "Chris Customer" 604, an illustrative user accessing the "Content Catalog." Because the user is viewing details regarding a specific offered item of audio content, and may wish to browse to other audio content, navigation links 606 are displayed. Navigation links 606 enable a user to browse and select other content available from the electronic marketplace 116. Currently, the user interface 600 depicts information for the audio content "My Life: An Autobiography," authored and narrated by "Carl Comedian" (a fictional entity) as illustrated in display feature 610. Display features 612-616 display further information corresponding to the audio content. Display feature 612, for example, is a graphic associated with the audio content, such as the cover of a corresponding text or an illustration of the audio content. Display feature 616 depicts ratings given to the audio content by users of the electronic marketplace 116, as well as length and release date information for the audio content.

The user interface 600 further includes control portion 614, which includes controls enabling a user to select the current item of audio content for acquisition, such as by placing the item of audio content into a virtual shopping cart for purchase or by adding the item of audio content to a "wish list" maintained by the electronic catalog 116.

In addition, user interface 600 includes an information portion 618 reflecting identified extra substantive material within the audio content. In this illustrative example, the extra substantive material corresponds to improvisational material included within the audio content by author and narrator, "Carl Comedian." Accordingly, the information portion 618 informs the user, "Chris Customer," of the existence of this extra substantive material within the audio content. Chris Customer may therefore be incentivized to acquire the audio content in order to access the extra substantive material.

Still further, the user interface 600 includes a sample request portion 620 enabling a user to request a sample of the audio content. Specifically, the sample request portion 620 includes two interface controls 622 and 624 enabling a user to access limited portions of the audio content (e.g., at a free or reduced cost). The first interface control 622 enables a user to request a "regular" sample portion of the audio content, such as a sample portion generated based on the entirety of the audio content. The second interface control 624 enables a user to request a sample of the extra substantive material within the audio content. Accordingly, user selection of input 624 may cause transmission of at least a portion of the extra substantive material within the audio content from the electronic marketplace 110 to the user computing device 120. In this manner, the user may be enabled to consume a portion of the extra substantive material prior to purchase, thereby enabling more information purchasing decisions.

Though the user interface 600 of FIG. 6 is described with respect to extra substantive material included within the described content item, additional embodiments of the user interface 600 may include additional or alternative information. For example, in one embodiment, a user interface 600 may be provided that identifies the existence of extra substantive material within a corresponding content item (e.g., other than the content item described in the user interface 600). Illustratively, a display page regarding the electronic book, "My Life: An Autobiography" may include a notification that the corresponding audio book includes extra substantive material not included within the electronic book.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing information regarding extra material within a content item, the system comprising:
   an electronic data store configured to store an electronic book and an audio book that is at least a partial audio representation of the electronic book; and
   a computing device in communication with the electronic data store, the computing device configured to at least:

generate alignment information mapping regions of the electronic book to corresponding regions of the audio book, based at least in part on the alignment information, identify a region within the audio book that does not correspond to a region within the electronic book;

obtain, from a human interaction task service, verification that the region identified within the audio book contains extra material, wherein the extra material is absent from the electronic book and contributes to the substance of the audio book; and cause transmission of a portion of the extra material to a user computing device as a sample of the audio book.

2. The system of claim 1, wherein the extra material includes at least one of an interview, improvisational material, commentary, or a sample of an additional content item.

3. The system of claim 1, wherein the alignment information is generated based at least in part on a comparison between text of the electronic book and a transcription of the audio book.

4. The system of claim 1, wherein the computing device is further configured to at least determine that the region satisfies threshold criteria for detection of the extra material absent from the electronic book.

5. The system of claim 4, wherein satisfaction of the threshold criteria requires at least one of a minimum length of the region, inclusion of a predetermined word, exclusion of a predetermined word, or a location of the region within a predefined portion of the audio book.

6. A computer-implemented method for providing information regarding extra material within a content item, the method comprising:

receiving, at a first computing device, a first content item and a second content item that is at least a partial representation of the first content item;

generating, by the first computing device, alignment information mapping portions of the first content item to corresponding portions of the second content item, determining, by the first computing device, a region within the first content item that does not correspond to a region within the second content item based at least in part on the generated alignment information;

analyzing, by the first computing device, the region within the first content item for the presence of extra material, wherein the extra material is absent from the second content item and contributes to the substance of the first content item; and transmitting, from the first computing device, an indication to a second computing device that the first content item includes the extra material.

7. The computer-implemented method of claim 6, wherein the first content item is at least one of textual content, video content, or audio content.

8. The computer-implemented method of claim 6, wherein the indication that extra material is present within the first content item is included within a display page output on the second computing device.

9. The computer-implemented method of claim 8, wherein the display page enables the second computing device to request a sample of the extra material.

10. The computer-implemented method of claim 9 further comprising:

receiving a request for a sample of the extra material; and
transmitting at least a portion of the extra material to the second computing device.

11. The computer-implemented method of claim 6, wherein generating the alignment information comprises:

generating a comparison of text of the first content item and a transcription of the second content item;
determining a correlation measure from the comparison;
determining that the correlation measure satisfies a threshold; and
generating alignment information indicating that the text can be aligned with the transcription.

12. The computer-implemented method of claim 6, wherein generating the alignment information comprises:

generating a comparison of text of the first content item and a transcription of the second content item;
determining a correlation measure from the comparison;
determining that the correlation measure does not satisfy a threshold; and
generating alignment information indicating that the text cannot be aligned with the transcription.

13. The computer-implemented method of claim 12, wherein analyzing, by the first computing device, the region within the first content item for the presence of extra material comprises:

determining a length of the region within the first content; and
determining that the length of the region satisfies a threshold length.

14. A non-transitory, computer-readable medium storing computer-executable instructions that, when executed by a computer system, configure the computer system to perform operations comprising:

generating alignment information that maps portions of a first content item to corresponding portions of a second content item, wherein the second content item at least partially represents the first content item;

identifying, based at least in part on the alignment information, a region within the first content item that is not represented within the second content item;

performing an analysis of the region within the first content item for the presence of extra material in the region, wherein the extra material is absent from the second content item and contributes to the substance of the first content item;

determining from the analysis that the extra material is present in the region; and causing transmission to a user computing device of an indication of the extra material within the first content item.

15. The non-transitory, computer-readable medium of claim 14, wherein the extra material includes at least one of an interview, improvisational material, commentary, or a sample of an additional content item.

16. The non-transitory, computer-readable medium of claim 14, wherein the analysis comprises determining that the region satisfies a set of threshold criteria.

17. The non-transitory, computer-readable medium of claim 16, wherein the analysis further comprises determining that the region satisfies the set of threshold criteria using auditory processing of the first content item.

18. The non-transitory, computer-readable medium of claim 14, wherein the operations further comprise causing transmission to a user computing device of at least a portion of the extra material within the first content item and absent from the second content item.

19. A system comprising:

an electronic data store configured to store a first content; and a first computing device in communication with the electronic data store, the first computing device configured to at least:
  generate alignment information that maps portions of the first content to corresponding portions a second content that is at least a partial representation of the first content; and
  based at least in part on the alignment information, identify a region within the first content that does not correspond to a region within the second content;
  analyze the region within the first content for the presence of extra material, wherein the extra material is absent from the second content and contributes to the substance of the first content; and
  transmit to a second computing device an indication that the first content includes the extra material.

20. The system of claim 19, wherein the first computing device is further configured to transmit the indication within a display page detailing information regarding the first content.

21. The system of claim 19, wherein the first computing device is further configured to provide at least a portion of the extra material to the second computing device.

22. The system of claim 19, wherein the first computing device is configured to analyze the region within the first content for the presence of extra material by:
  determining that the region with the first content satisfies a set of threshold criteria; and
  in response to determining that the set of threshold criteria is satisfied, verifying that the region within the first content includes extra material.

23. The system of claim 22, wherein the threshold criteria comprises at least one of:
  a minimum length of the region,
  inclusion of a predetermined word within the region,
  exclusion of a predetermined word from the region, or
  location of the region within a predefined portion of the first content.

24. The system of claim 22, wherein the first computing device is further configured to determine that the region within the first content satisfies the set of threshold criteria using a textual analysis of the first content.

* * * * *